(12) United States Patent
Chen

(10) Patent No.: US 7,681,246 B1
(45) Date of Patent: Mar. 16, 2010

(54) SYSTEM AND METHOD FOR SERVER SIDE DATA SIGNING

(75) Inventor: Ling Tony Chen, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 992 days.

(21) Appl. No.: 10/717,770

(22) Filed: Nov. 20, 2003

(51) Int. Cl.
*G06F 7/02* (2006.01)
(52) U.S. Cl. .................. 726/30; 713/176; 713/187; 380/251
(58) Field of Classification Search ........... 713/176, 713/181, 187; 380/251; 726/26, 27, 30
See application file for complete search history.

(56) References Cited

U.S. PATENT DOCUMENTS

| | | | |
|---|---|---|---|
| 5,643,086 A * | 7/1997 | Alcorn et al. | 463/29 |
| 5,671,367 A * | 9/1997 | Le Roux | 710/301 |
| 6,106,396 A * | 8/2000 | Alcorn et al. | 463/29 |
| 6,149,522 A * | 11/2000 | Alcorn et al. | 463/29 |
| 6,202,151 B1 * | 3/2001 | Musgrave et al. | 713/186 |
| 6,377,994 B1 * | 4/2002 | Ault et al. | 709/229 |
| 6,675,152 B1 * | 1/2004 | Prasad et al. | 705/64 |
| 7,073,063 B2 * | 7/2006 | Peinado | 713/171 |
| 7,116,782 B2 * | 10/2006 | Jackson et al. | 380/251 |
| 7,409,061 B2 * | 8/2008 | Newcombe | 380/251 |
| 2002/0002076 A1 * | 1/2002 | Schneier et al. | 463/29 |
| 2002/0116615 A1 * | 8/2002 | Nguyen et al. | 713/168 |
| 2003/0060286 A1 * | 3/2003 | Walker et al. | 463/42 |
| 2003/0093678 A1 * | 5/2003 | Bowe et al. | 713/180 |
| 2003/0145237 A1 * | 7/2003 | Chang et al. | 713/202 |
| 2003/0167407 A1 * | 9/2003 | Howard | 713/201 |

OTHER PUBLICATIONS

Krawczyk, H., M. Bellare, and R. Canetti. 1997. "HMAC: Keyed-Hashing for Message Authentication." Network Working Group. 10 pp. Available at http://www.ietf.org/rfc/rfc2104.txt?number=2104.

* cited by examiner

*Primary Examiner*—Kimyen Vu
*Assistant Examiner*—Edward Zee
(74) *Attorney, Agent, or Firm*—Workman Nydegger

(57) ABSTRACT

To ensure data integrity, data are signed using a server-side key before being stored with a signature in a persistent storage on a client. Before the data that were stored are subsequently used, the data signature is verified to confirm that the data have not been modified. A signer identification (ID) uniquely identifying the client is sealed into the signature so that the identity of the signer cannot be changed without invalidating the data signature. If the data or the signer ID is altered, a temporary signature computed for the stored data and signer ID will differ from the signature that was stored. The server preferably signs a digest of the data to be stored and verifies a digest of the stored data. An intermediate key can be provided by the server to enable plural sets of data on the client to be signed before storage.

3 Claims, 13 Drawing Sheets

SYSTEM AND METHOD FOR SERVER SIDE DATA SIGNING

FIELD OF THE INVENTION

This invention generally pertains to a system and method for securely signing data about to be stored so that any alteration of the data can be detected before the data are subsequently used, and more specifically, pertains to a system and method for computing a signature stored with the data using a secure key, wherein the signature can securely incorporate a signer identification (ID), so that verification of the signature before enabling a client computing device to access and use the data that were stored ensures that neither the data nor the signer ID has been altered.

BACKGROUND OF THE INVENTION

Online garners are notorious for coming up with creative ways to cheat during online game play. The cheating often involves modifying data saved to a persistent storage (such as a hard drive or a memory card) when concluding a current game session. If the data that are stored are then altered by a user, the modified data will be read when starting the next game session. The modification to the data can enable cheating to occur during game play, alter the previous game results so that the gamer is incorrectly ranked higher in a leaderboard, or provide the cheating gamer with some other unearned advantage.

Clearly, in this and other applications, it would be desirable to ensure that data saved to a persistent storage remain unmodified. If the data have been changed, the computing device with which the data storage is associated can be precluded from using the data that were stored. When applied to online gaming, the present invention can thus be employed to ensure that the data altered by a gamer is not loaded for use in subsequent game play. Similarly, in other applications, knowledge that data stored have been altered can be used to carry out other appropriate measures.

In the past, data signing typically has addressed the problem of ensuring that data being transferred between two parties is indeed being sent by the party purporting to be the source of the data. Data signing for this purpose has employed various methods of encoding, decoding, and verifying the data source. These methods typically involve the sharing of keys, such as a public key and a private key pair. The party sending the data signs it with a private key that is known only to that party, and the party receiving it verifies the data using the public key that will only be successful in verifying the data if the private key was used in signing it. However, the transfer of data between parties is a different problem than ensuring that stored data are not altered by a party having access to the stored data.

What is needed is a method for ensuring that stored data have not been altered that does not require key sharing, but securely signs the data that were stored, while providing a way to verify that the data have not been altered using the signature. In addition, it would be desirable to identify the entity that signed the data by incorporating a signer ID in the signature applied to the data before storage. Successful verification of the data that were stored and of the signer ID being unchanged will thereby ensure that the stored data have not been modified and can be used. Such a method is not restricted to a gaming environment but can be used to ensure the integrity of stored data in many other applications.

SUMMARY OF THE INVENTION

An exemplary application of the present invention enables a gaming service to ensure that stored data related to an online game are not modified by a user of the gaming service when the stored data are loaded by the computing device of the user for playing a subsequent session of the online game. It is generally assumed that it would be relatively difficult to modify the data in RAM during game play and before the present invention is applied. The present invention is thus useful to detect any alteration of the data that are stored on the computing device of the user before the stored data are used, so that the gaming service can stop altered data from being employed in subsequent game sessions. Other applications of the present invention are contemplated that are not necessarily limited to online game play, so the exemplary application that is discussed below is not intended to be limiting.

In this exemplary gaming application, a server computing device (e.g., at the online gaming service) signs the data about to be stored by a client computing device (e.g., by a game console). It is critical that the key used to perform the signing be kept private and stored at the server to prevent access of the key by users on the client side who might wish to tamper with data and forge signatures. However, the terms client and server computing devices are only intended to be relative, and the roles played by each can readily be switched. Thus, in other applications of the present invention, data about to be stored by a server computing device might be signed by a client computing device and later verified by the client computing device to ensure that the data have not been changed while stored by the server computing device. Accordingly, the terms used in the following explanation and in the claims that follow are not intended to be limiting, but should be viewed as simply representative of entities that are interacting in regard to storing and verifying data. These entities are thus interchangeable within the scope of the present invention and the claims that follow.

A first aspect of the present invention is directed to a method for ensuring that data stored in a persistent storage of a client computing device have not been modified when the data are subsequently accessed for use by the client computing device. The method includes the step of employing a key that is only known and available for use by a server computing device in computing a signature for the data before the data are stored in the persistent storage by the client computing device. The signature and the data that have been signed with the key are then stored in the persistent storage of the client computing device. Before the data are subsequently used by the client computing device, the data that were stored are verified using the signature to determine whether the data that were stored have been changed. The data that were stored are only used if the verification indicates that the data that were stored have not been changed.

Several different embodiments are contemplated. For example, the step of employing the key can comprise the step of sending the data from the client computing device to the server computing device so that the server computing device computes the signature for the data and sends the signature back to the client for storage with the data. This embodiment becomes less practical if the client and server are connected over a relatively slow connection and the amount of data being signed is relatively large. In this embodiment, the step of verifying comprises the steps of sending the data and the signature that were stored from the client computing device to the server computing device, and using the key, computing a temporary signature for the data that were stored. The temporary signature is then compared with the signature to determine a result. The result indicates that the data that were stored have been altered, if the temporary signature is different than the signature. The result is sent from the server computing device to the client computing device.

In another embodiment, a digest of the data is computed by the client computing device before the data are stored in the persistent storage. The server computing device computes the signature of the digest using the key and sends the signature to the client computing device for storage in the persistent storage. The step of verifying comprises the steps of computing a temporary digest of the data that were stored and sending the temporary digest and the signature from the client computing device to the server computing device. On the server computing device, the key is used for computing a temporary signature of the temporary digest, which is compared with the signature to determine the result that is sent to the client computing device.

Preferably, the method also provides for the server computing device to obtain a signer identification (ID) for the client computing device that uniquely identifies the client computing device and is not controlled by an operator of the client computing device. This approach is typically possibly when a strong authentication system is deployed on the server computing device (or on a system of which the server computing device is a part). The signer ID is concatenated with the digest before computing the signature on the server computing device, and the signer ID and the signature are then stored in the persistent storage of the client. In this embodiment, the step of verifying includes the step of computing a temporary digest of the data that were stored; sending the signer ID, the signature, and the temporary digest of the data to the server; and concatenating the signer ID and the temporary digest. The server computing device uses the key for computing a temporary signature for the signer ID and the temporary digest that were concatenated and compares the temporary signature with the signature to determine the result.

In some applications of the present invention, the data may comprise a plurality of different sets of data, so that it would be inefficient for the server computing device to sign each set. Accordingly, in another embodiment, the server obtains a signer ID for the client computing device and uses the key for computing an intermediate key from a concatenation of an arbitrary value (e.g., a time stamp or a one time random value) and the signer ID. The intermediate key is sent to the client computing device for use in signing each set of the data to produce a signature for the set of data. The client computing device then stores the signature, the arbitrary value, and the signer ID in the persistent storage. However, the intermediate key should never be stored in persistent storage. To verify a set of the data, a temporary digest of the set of the data that were stored is determined and is sent along with the arbitrary value and the signer ID to the server computing device. A temporary intermediate key is computed using the concatenation of the arbitrary value and the signer ID. Using the temporary intermediate key, the server computing device computes a temporary signature for the temporary digest and compares the temporary signature with the signature to determine the result. The step of comparison also determines if the signer ID that was sent from the client computing device to the server computing device has been altered. A further step is determining if the signer ID that was received from the client computing device is on a list of banned signer IDs, and if so, indicating in the result that the set of data are not usable by the client computing device.

In another embodiment, the key is a private key of a private key and public key pair. In this embodiment, the signer ID is again preferably obtained for the client computing device and concatenated with the digest of the data. The server computing device signs the signer ID concatenated with the digest using the private key and sends the signature to the client computing device for storage on the persistent storage. Before using the data that were stored, a temporary digest of the data that were stored is determined. Using the public key of the private key and public key pair, the client computing device verifies the signature that was stored, thereby recovering the digest and the signer ID. The temporary digest is then compared to the digest that was recovered to determine if the data that have been stored have been altered. Optionally, the method may include determining if the public key is still valid.

Another aspect of the present invention is directed to a memory medium on which machine readable instructions are stored for carrying out the steps of the method discussed above.

Still another aspect of the present invention is directed to a client computing device in which data are stored. The client computing device includes a memory in which machine instructions are stored, and a persistent storage used to store data. A network interface is adapted to link the client computing device in communication with a server computing device over a network. Coupled to the memory, the persistent storage, and the network interface is a processor that executes the machine instructions to carry out a plurality of functions. Specifically, before storing data, a signature for the data is determined using a key known only by a server computing device and not available to the client computing device. The data and the signature are stored in the persistent storage. Before using the data that was stored in the persistent storage, a verification that the data have not been altered is obtained as a function of the signature. The data that were stored are used only if the verification indicates that the data that were stored have not been changed since the signature was computed. Other aspects of the client computing device are generally consistent with the steps of the method discussed above.

Still another aspect of the present invention is directed to a server computing device that is employed in determining whether data stored in a persistent storage on a client computing device have been altered since the data were initially stored. The server computing device includes a memory in which machine instructions are stored, and a network interface adapted to link the server computing device in communication with a client computing device over a network. A processor is coupled to the memory and the network interface and executes the machine instructions to carry out a plurality of functions. The functions include employing a key that is only known and available for use by the server computing device to compute a signature for the data before the data are stored in a persistent storage by a client computing device. The signature is sent to a client computing device and stored in a persistent storage in association with the data. Before the data that were stored are subsequently used by a client computing device, a verification is made to determine whether the data that were stored have been altered. Other aspects of the server computing device are generally consistent with the steps of the method discussed above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Exemplary Computing System for Implementing Present Invention

Figure 1:
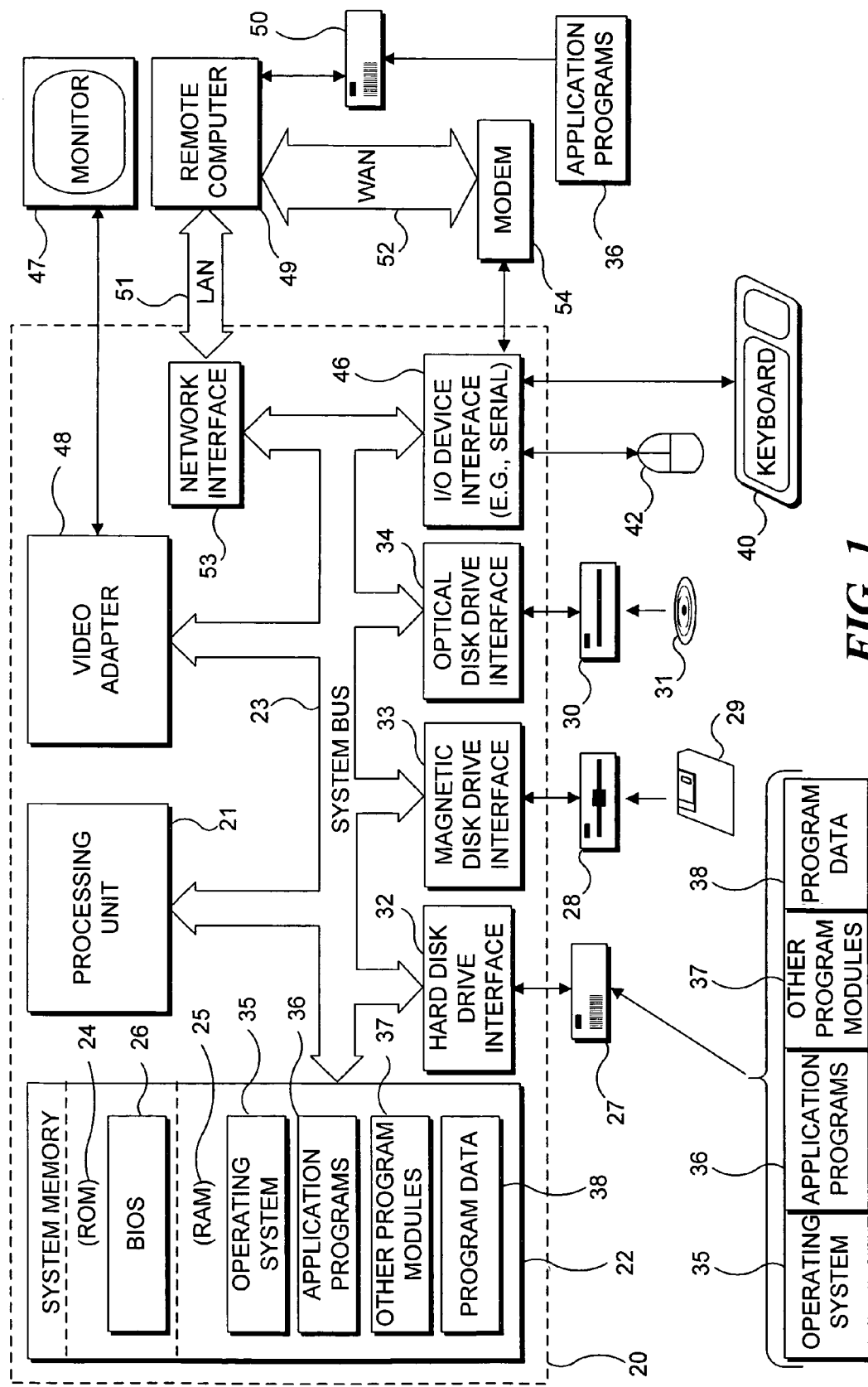
FIG. 1 is a functional block diagram of a generally conventional computing device or personal computer (PC) that is suitable for use as a server on gaming service used in practicing the present invention.

With reference to FIG. 1, an exemplary computing device suitable for implementing various portions of the present invention, including the functions of a trusted device for signing data and verifying that the data have not been altered. In the exemplary application of the present invention, these function are implemented by a server computing device that is included in an online gaming service such as Microsoft Corporation's XBOX LIVE™. The server comprises a general purpose computing device in the form of a conventional PC 20, provided with a processing unit 21, a system memory 22, and a system bus 23. The system bus couples various system components including the system memory to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the PC 20, such as during start up, is stored in ROM 24. The PC 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31, such as a compact disk-read only memory (CD-ROM) or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer readable media provide nonvolatile storage of computer readable machine instructions, data structures, program modules, and other data for PC 20. Although the exemplary environment described herein employs a hard disk, removable magnetic disk 29, and removable optical disk 31, it will be appreciated by those skilled in the art that other types of computer readable media, which can store data and machine instructions that are accessible by a computer, such as magnetic cassettes, flash memory cards, digital video disks (DVDs), Bernoulli cartridges, RAMs, ROMs, and the like, may also be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into PC 20, and provide control input through input devices such as a keyboard 40 and a pointing device 42. Pointing device 42 may include a mouse, stylus, wireless remote control, or other pointer. As used herein, the term "mouse" is intended to encompass virtually any pointing device that is useful for controlling the position of a cursor on the screen. Other input devices (not shown) may include a microphone, joystick, haptic joystick, yoke, foot pedals, game pad, satellite dish, scanner, or the like. These and other input/output (I/O) devices are often connected to processing unit 21 through an I/O interface 46 that is coupled to the system bus 23. The term I/O interface is intended to encompass each interface specifically used for a serial port, a parallel port, a game port, a keyboard port, and/or a universal serial bus (USB). A monitor 47 or other type of display device is also connected to system bus 23 via an appropriate interface, such as a video adapter 48. In addition to the monitor, PCs are often coupled to other peripheral output devices (not shown), such as speakers (through a sound card or other audio interface—not shown) and printers.

The present invention may be practiced on a single machine, however, PC 20 can also operate in a networked environment using logical connections to one or more remote computers, such as a remote computer 49. Remote computer 49 may be another PC, a server (which is typically generally configured much like PC 20), a router, a network PC, a peer device, or a satellite or other common network node, and typically includes many or all of the elements described above in connection with PC 20, although only an external memory storage device 50 has been illustrated in FIG. 1. The logical connections depicted in FIG. 1 include a local area network (LAN) 51 and a wide area network (WAN) 52. Such networking environments are common in offices, enterprise wide computer networks, intranets, and the Internet.

When used in a LAN networking environment, PC 20 is connected to LAN 51 through a network interface or adapter 53. When used in a WAN networking environment, PC 20 typically includes a modem 54, or other means such as a cable modem, Digital Subscriber Line (DSL) interface, or an Integrated Service Digital Network (ISDN) interface for establishing communications over WAN 52, such as the Internet. Modem 54, which may be internal or external, is connected to the system bus 23 or coupled to the bus via I/O device interface 46, i.e., through a serial port. In a networked environment, program modules depicted relative to PC 20, or portions thereof, may be stored in the remote memory storage device. It will be appreciated that the network connections shown are exemplary and other means of establishing a communications link between the computers may be used, such as wireless communication and wide band network links. A signing server and other servers employed to provide the various functions of the online gaming service will likely access large hard drives or other non-volatile memory systems for storing data about subscribing users and for other elements of the gaming service. A signing server will execute machine language instructions to implement signing the data (or a digest of the data) before the data are stored, and verifying the data that were stored before a game console on which the data were stored is permitted to use the data.

In other applications, a server not associated with a gaming function may carry out the same functions as the signing server in the gaming environment, or alternatively, a client computing device may do so, if the data are stored by a server computing device. Thus, the terms client and server computing device are relative and the functions that are performed by each in the exemplary gaming application discussed herein can readily be interchanged, as appropriate, depending on which is storing the data and which is the trusted or not trusted in regard to signing and verifying. These functions will be apparent from the following discussion.

Exemplary Game Console

Figure 2:
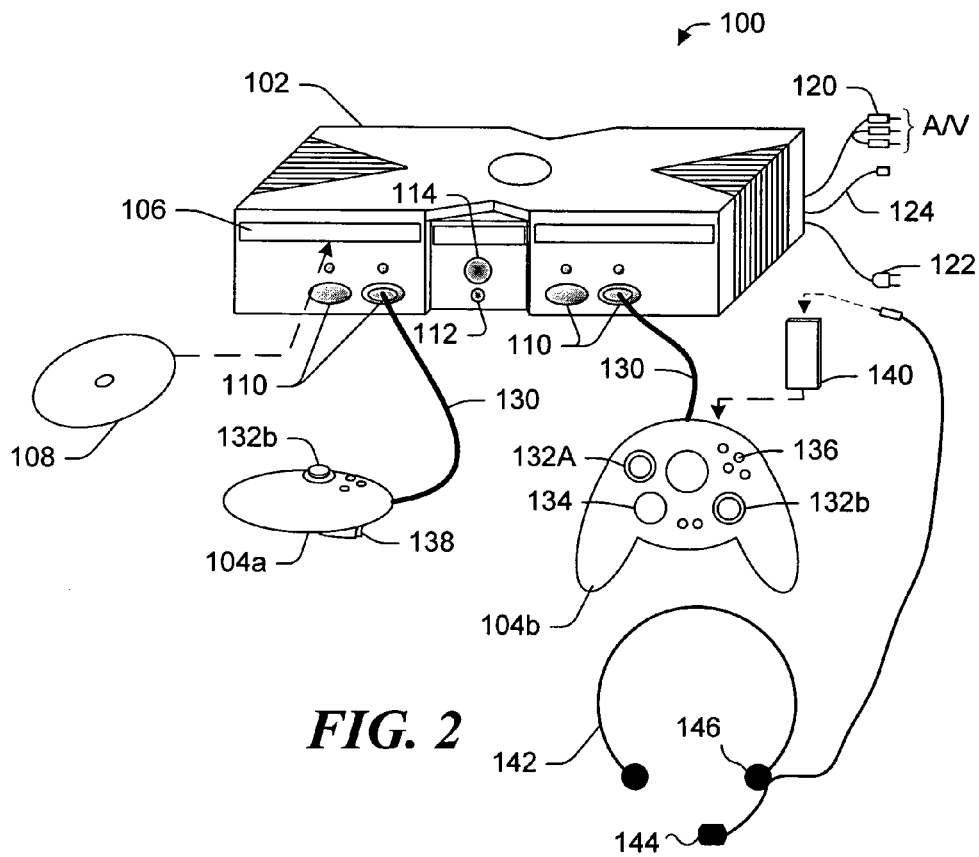
FIG. 2 is an isometric view of a game console used in playing online games by connecting to a gaming service.

In the following application of the present invention, a game console 100 stores data that might be altered before being used in a subsequent game session and is therefore preferably signed and verified by a gaming service server computing device before the data that were stored are used. As shown in FIG. 2, an exemplary electronic gaming system 100 includes game console 102 and supports up to four user input devices, such as controllers 104a and 104b. Game console 102 is equipped with an internal hard disk drive (not shown in this Figure) and a portable media drive 106 that supports various forms of portable optical storage media, as represented by an optical storage disk 108. Examples of suitable portable storage media include DVD disks and CD-ROM disks. In this gaming system, game programs are preferably distributed for use with the game console on DVD disks, but it is also contemplated that other storage media might instead be used, or that games and other programs can be downloaded from a gaming site over the Internet (or other network).

On a front face of game console 102 are four connectors 110 that are provided for electrically connecting to the controllers. It is contemplated that other types of connectors or wireless connections might alternatively be employed. A power button 112 and a disk tray eject button 114 are also positioned on the front face of game console 102. Power button 112 controls application of electrical power to the game console, and eject button 114 alternately opens and closes a tray (not shown) of portable media drive 106 to enable insertion and extraction of storage disk 108 so that the digital data on it can be read and loaded into memory or stored on the hard drive for use by the game console.

Game console 102 connects to a television or other display monitor or screen (not shown) via audio/visual (A/V) interface cables 120. A power cable plug 122 conveys electrical power to the game console when connected to a conventional alternating current line source (not shown). Game console 102 may be further provided with a data connector 124 to transfer data through an Ethernet connection to a network and/or through a broadband connection to the Internet. Alternatively, it is contemplated that a modem (not shown) may be employed to transfer data to a network and/or the Internet. As yet a further alternative, the game console can be directly linked to another game console via an Ethernet crossover cable (not shown).

Each controller 104a and 104b is coupled to game console 102 via a lead (or alternatively, through a wireless interface). In the illustrated implementation, the controllers are Universal Serial Bus (USB) compatible and are connected to game console 102 via USB cables 130. Game console 102 may be equipped with any of a wide variety of user devices for interacting with and controlling the game software. As illustrated in FIG. 2, each controller 104a and 104b is equipped with two thumb sticks 132a and 132b, a D-pad 134, buttons 136, and two triggers 138. These controllers are merely representative, and other gaming input and control mechanisms may be substituted for or used in addition to those shown in FIG. 2, for controlling game console 102.

Removable function units or modules can optionally be inserted into controllers 104 to provide additional functionality. For example, a portable memory unit (not shown) enables users to store game parameters and port them for play on another game console by inserting the portable memory unit into a controller on the other console. Other removable function units are available for use with the controller. In connection with the present invention, a removable function unit comprising a voice communicator module 140 is employed to enable a user to verbally communicate with other users locally and/or over a network. Connected to voice communicator module 140 is a headset 142, which preferably includes a boom microphone 144 or other type of audio sensor that produces an input signal in response to incident sound, and a headphone 146 or other type of audio transducer for producing audible sound in response to an output signal from the game console. Alternatively, the voice communicator capability is included as an integral part of a controller (not shown) that is generally like controllers 104a and 104b in other respects. The controllers illustrated in FIG. 2 are configured to accommodate two removable function units or modules, although more or fewer than two modules may instead be employed.

Gaming system 100 is of course capable of playing games, but can also play music, and videos on CDs and DVDs. It is contemplated that other functions can be implemented by the game controller using digital data stored on the hard disk drive or read from optical storage disk 108 in drive 106, or from an online source, or from a function unit or module.

It must be emphasized that as supplied, game console 102 is incapable of browsing the Internet or connecting to Web addresses that display Web Pages defined by any form of hypertext markup language (HTML). Instead, it can only connect to a dedicated gaming service that has been set up to communicate with the game console over the Internet and to facilitate multiplayer games by subscribers to the service who connect through game consoles that are registered with the gaming service. Each connection over the Internet is through a VPN tunnel, so that the communications between the game console and the gaming service are secure. The game console is not currently provided with a conventional keyboard, so that entry of text messages or other text input is possible only by selecting alphanumeric characters from a virtual keyboard display using one of the controllers. The game consoles do not have direct communication with parties outside of the environment for playing multiplayer games, and that function is instead provided by the gaming service.

Figure 3:
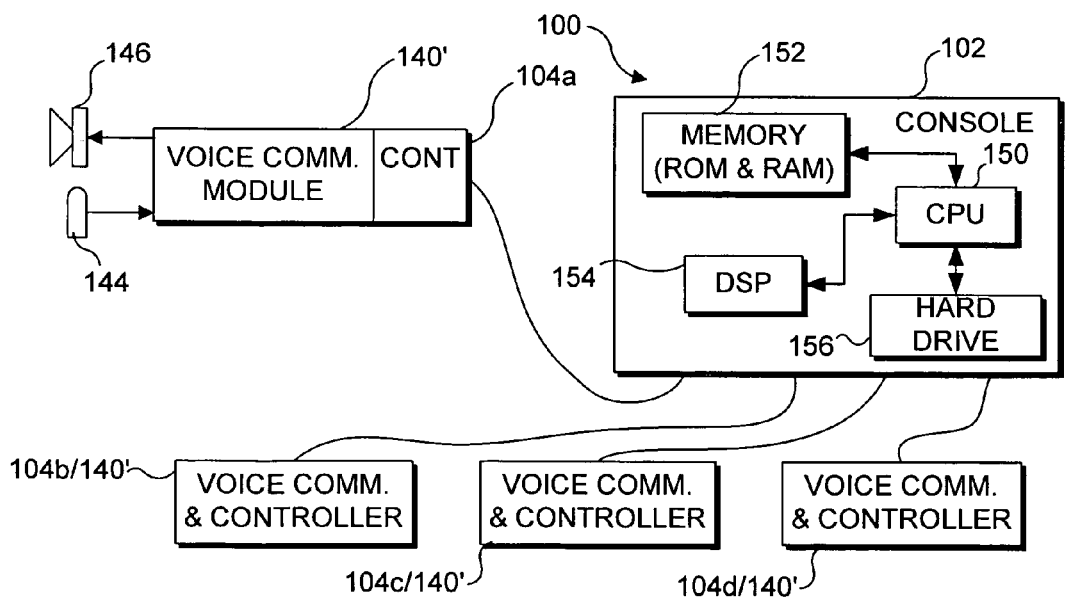
FIG. 3 is a functional block diagram of a game console like that shown in FIG. 2.

FIG. 3 is a functional block diagram illustrating, in an exemplary manner, components of the game console. As noted above, this embodiment of game console 100 can have up to four players on each console, and each player can be provided with a controller and voice communicator. It will be understood that controllers 104a, 104b, 104c, and 104d (if coupled to game console 100) can optionally each include a corresponding voice communication module 140'.

With reference to multiplayer game console 100, several key functional components are shown, although it should be understood that other functional components are included. Specifically, game console 100 includes a CPU 150, and a memory 152 that includes both ROM and RAM. Also provided are a DSP 154 and a hard drive 156. Hard drive 156 stores data corresponding to a current state of a game at the time a game session was ended and includes information such as the current level in an online game that has been achieved by the players using the game console. The data that are stored on the hard drive should not be altered by any user of game console 100, since changing the data to give a user a higher level or to advance the user within the game play, or give the user any other advantage not earned within the constraints of game play would cheat other players participating in the next online game session in which the modified data would be used. The present invention detects data that have been modified and causes the game console not to load data that has been modified since the data were stored at the end of a previous game session.

Gaming Environment

Figure 3A:
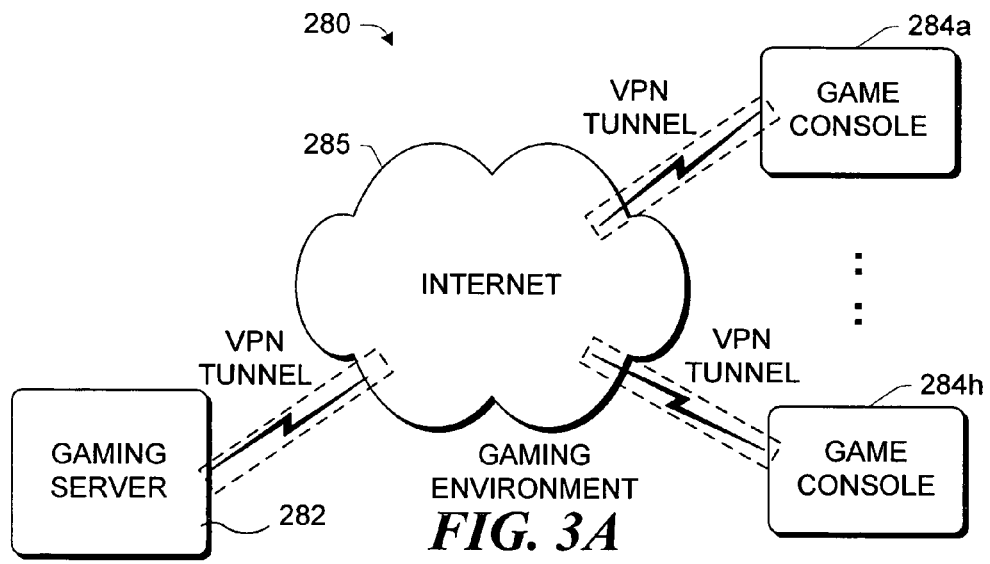
FIG. 3A is a schematic diagram illustrating how a plurality of game consoles are connected in communication over the Internet, through a gaming service implemented by a gaming server.
Figure 3B:
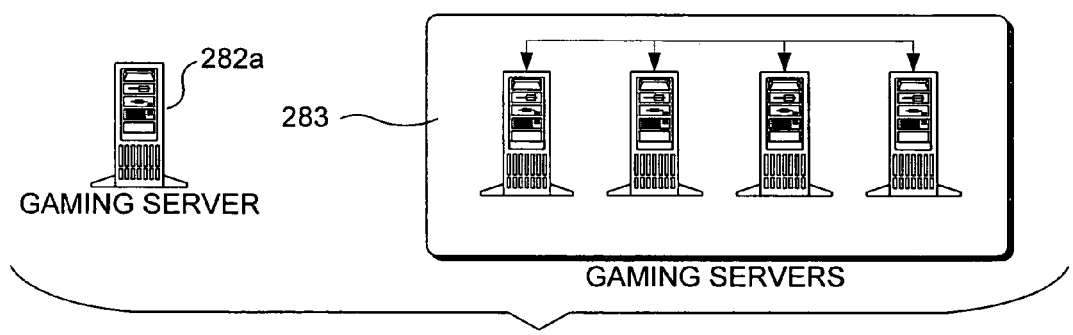
FIG. 3B is a schematic diagram illustrating a game server that is one of a plurality of game servers used for implementing the gaming service.

FIGS. 3A and 3B illustrate different aspects of the gaming environment. In FIG. 3A, a schematic diagram 280 shows that the gaming environment comprises a plurality of game consoles 284a-284h, which are connected to a gaming server 282. Data packets are conveyed between the gaming server and the game consoles through VPN tunnels, over Internet 285. Each game console 284a-284h is thus connected in secure communication with gaming server 282, which as shown in FIG. 3B may comprise a single server 282a, or alternatively and more likely, will include a plurality of servers 283 that are coupled together to carry out specific functions required for the gaming service. Use of the VPN tunnel insures a secure connection link between each game console and the gaming service. The secure gaming environment of FIG. 3A does not provide any option for connecting a game console over the Internet to any other device and only permits communication between game consoles that are connected to the gaming service, to enable the game consoles to participate in multiplayer games. Although a game console can conduct certain administrative functions such as subscribing, selecting passwords, and indicating other players with whom a person using the game console wants to participate in a multiplayer game, the game consoles are unable to communicate over the Internet outside the gaming environment defined by FIG. 3A.

Data Signing and Verification

Figure 4:
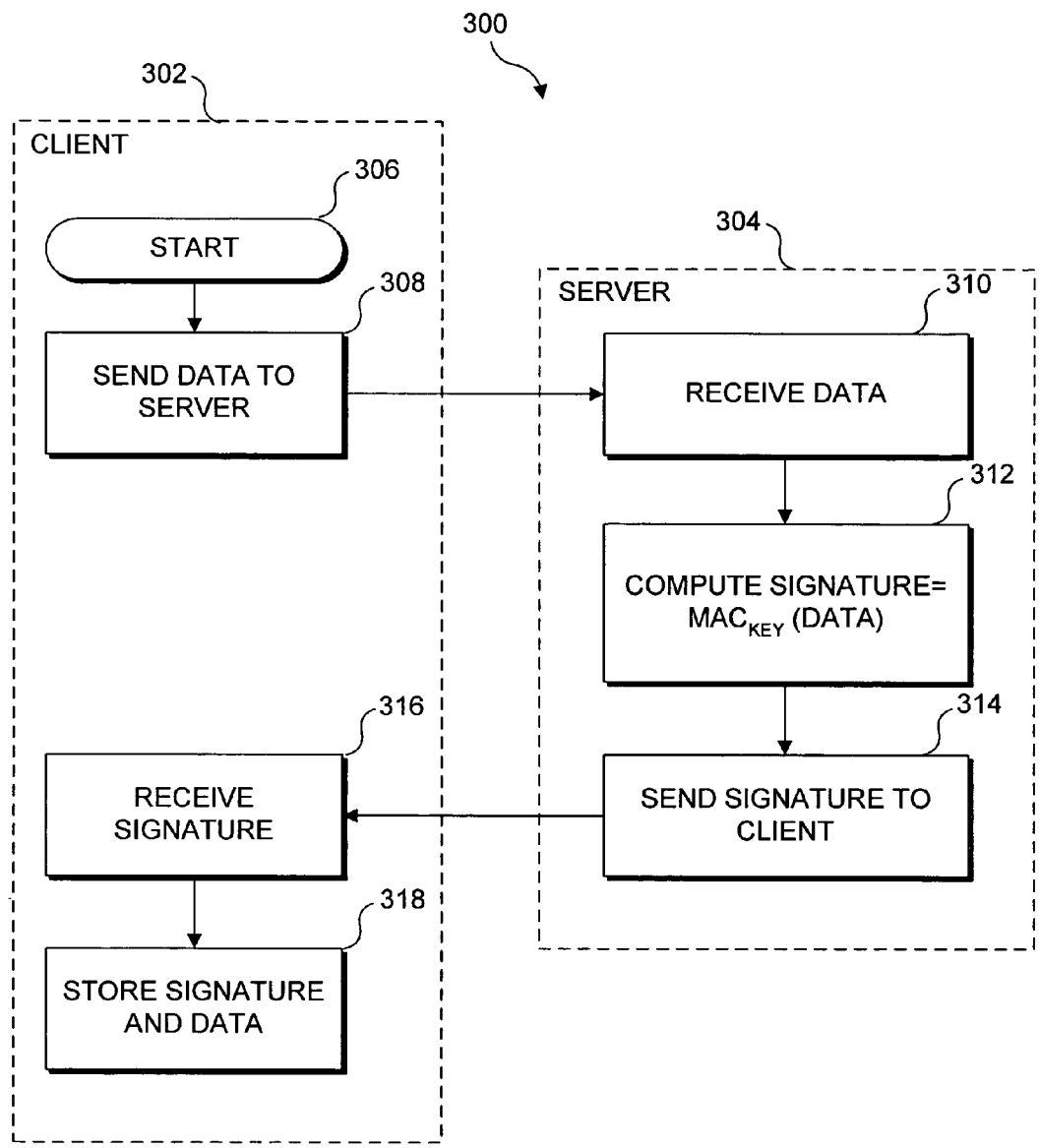
FIG. 4 is a flow chart showing a process for signing data directly.
Figure 5:
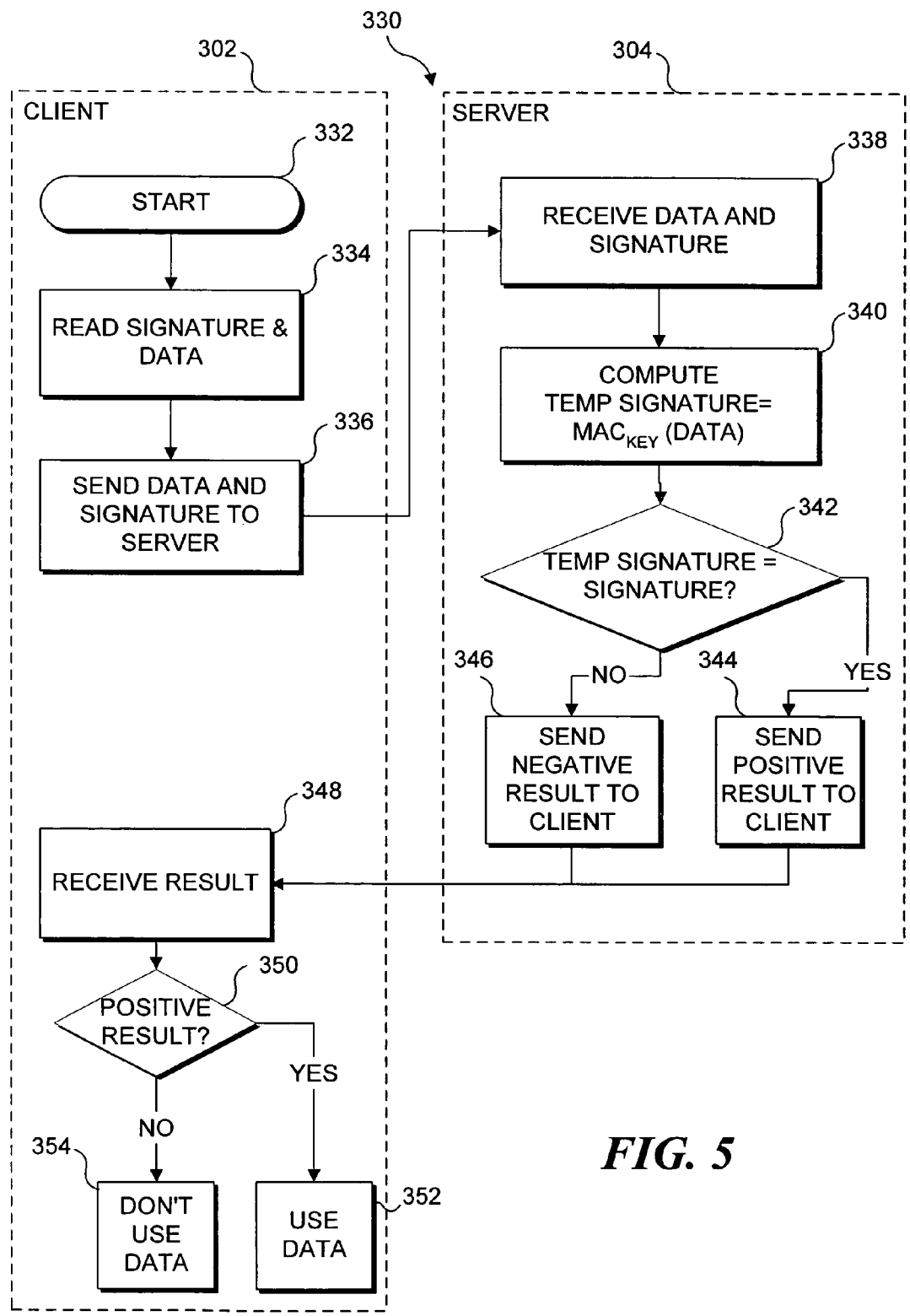
FIG. 5 is a flow chart showing a process for verifying the data based on the signature of FIG. 4.

The embodiment of the present invention that is illustrated in FIG. 4 and FIG. 5 clearly represents the fundamental approach used by the present invention for server-side data signing and verification. This embodiment is generally applicable in situations where limitations on data transfer rate are not an issue and/or where the amount of data to be signed and later verified as unaltered is relatively small. FIG. 4 illustrates, in an exemplary manner, the process of data signing by a trusted entity—in this example, a server computing device at the gaming service. To simplify the explanation of the various embodiments of the present invention, the trusted entity will be referred to as the server computing device, or more succinctly, as the server, while the untrusted entity that is storing the data is referred to as the client computing device, or simply as the client.

As indicated in a flow chart 300 in FIG. 4, a client 302 initiates the process in a step 306. The client sends the data to be signed to a server 304 in a step 308. The server receives the data in a step 310 and computes a signature by applying a key known only to the server in a step 312. In a preferred embodiment, the server computes the signature using a Keyed-Hash Message Authentication Code (HMAC). The HMAC technique for signing a document is described in Federal Information Processing Standards Publication 198, published Mar. 6, 2002, which notes that HMACs typically have two functionally distinct parameters, including a message input and a secret key that is known only to the message originator and intended receiver(s). However, the present invention uses the HMAC in a different manner, and the key is not known to any client, but is only known on the server. The HMAC employs the secret key in connection with a SHA-1 hashing function applied to the data in this embodiment to produce a signature that will be completely different if even a single bit of the data is changed. It must be emphasized that other secure signing algorithms can be used for securely signing the data before the client stores the data. The present invention is not in any way limited to using the HMAC for signing the data, since other secure signing techniques that use a secret key can alternatively be used. One of these alternatives is explained below in regard to another embodiment that employs a private and public key pair.

After signing the data to obtain a signature, the server sends the signature back to the client in a step 314. The client receives the signature in a step 316 and stores the data and signature on the hard drive or a portable memory unit (or on almost any other form of persistent storage) of the client in a step 318. It is also contemplated that the data may instead be stored on a remote persistent storage (not on the client) after being signed by the server.

FIG. 5 illustrates the logical steps of a process for verifying the data that were signed in the embodiment of FIG. 4. The verification is carried out using the secret key and the data that were stored. A flow chart 330 indicates client 302 initiates the verification process in a step 332, e.g., by preparing to load the data that were stored, for use in a subsequent game session. The client reads the stored data and signature in a step 334 and then sends the data and signature to server 304 in a step 336. The server receives the data and signature from the client in a step 338 and computes a temporary signature in a step 340 using the same HMAC (or other secure signing) algorithm and key that was used during the data signing process. The server then compares the temporary signature to the signature that the client previously stored and sent to the server, in a decision step 342. If the temporary signature and the signature are equal, the server sends a positive result back to the client in a step 344 (i.e., indicating that the data have not changed since the data were store); otherwise, the server sends a negative result back to the client in a step 346, indicating that the data have been altered. The client receives the result in a step 348. The client evaluates the result in a decision step 350 and if the result is positive, the client uses the data as shown in a step 352. Otherwise, the client is not permitted to use the data, as shown in a step 354.

Data Signing and Verification Using a Digest

Figure 6:
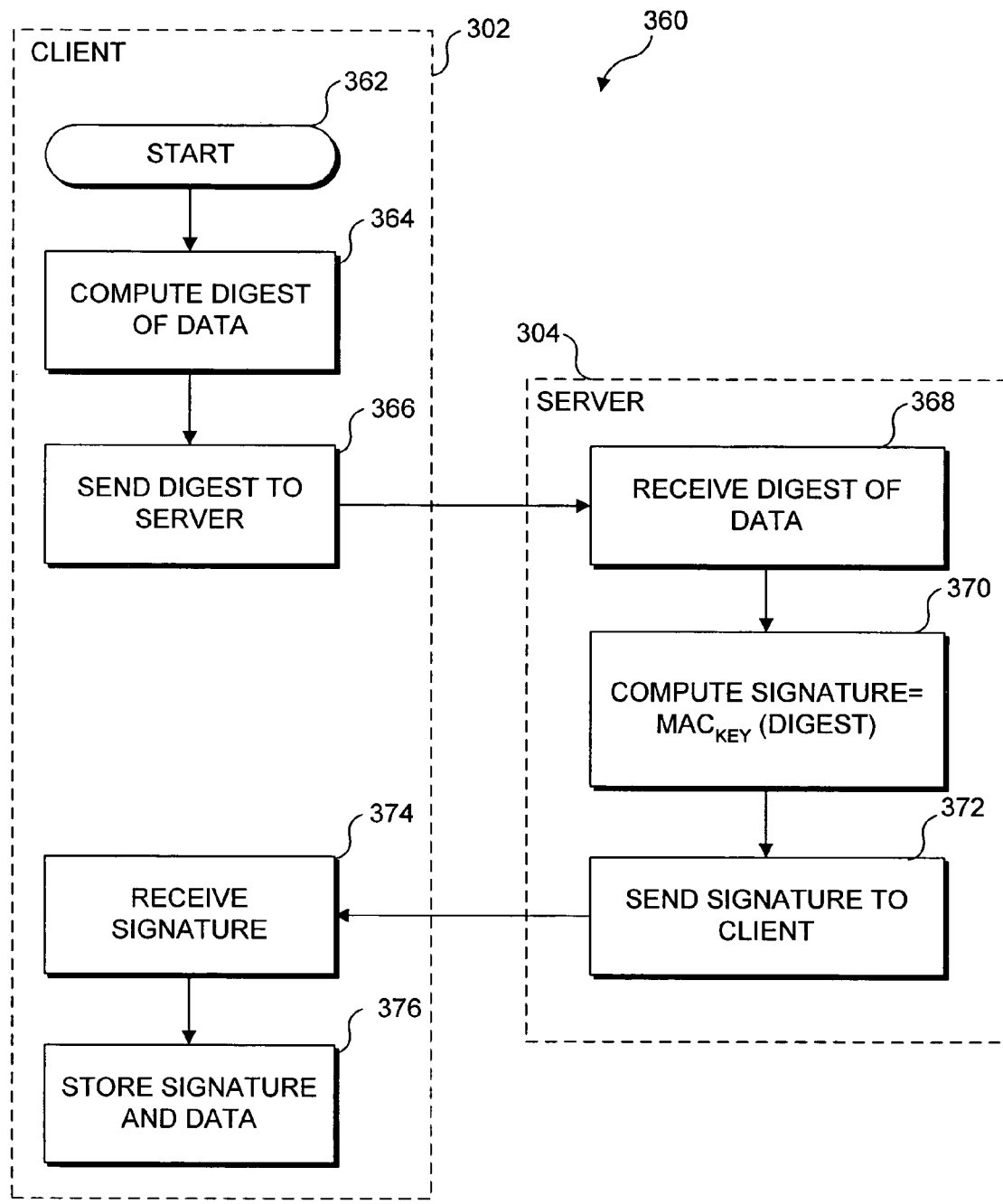
FIG. 6 is a flow chart showing a process for signing of a digest of data.
Figure 7:
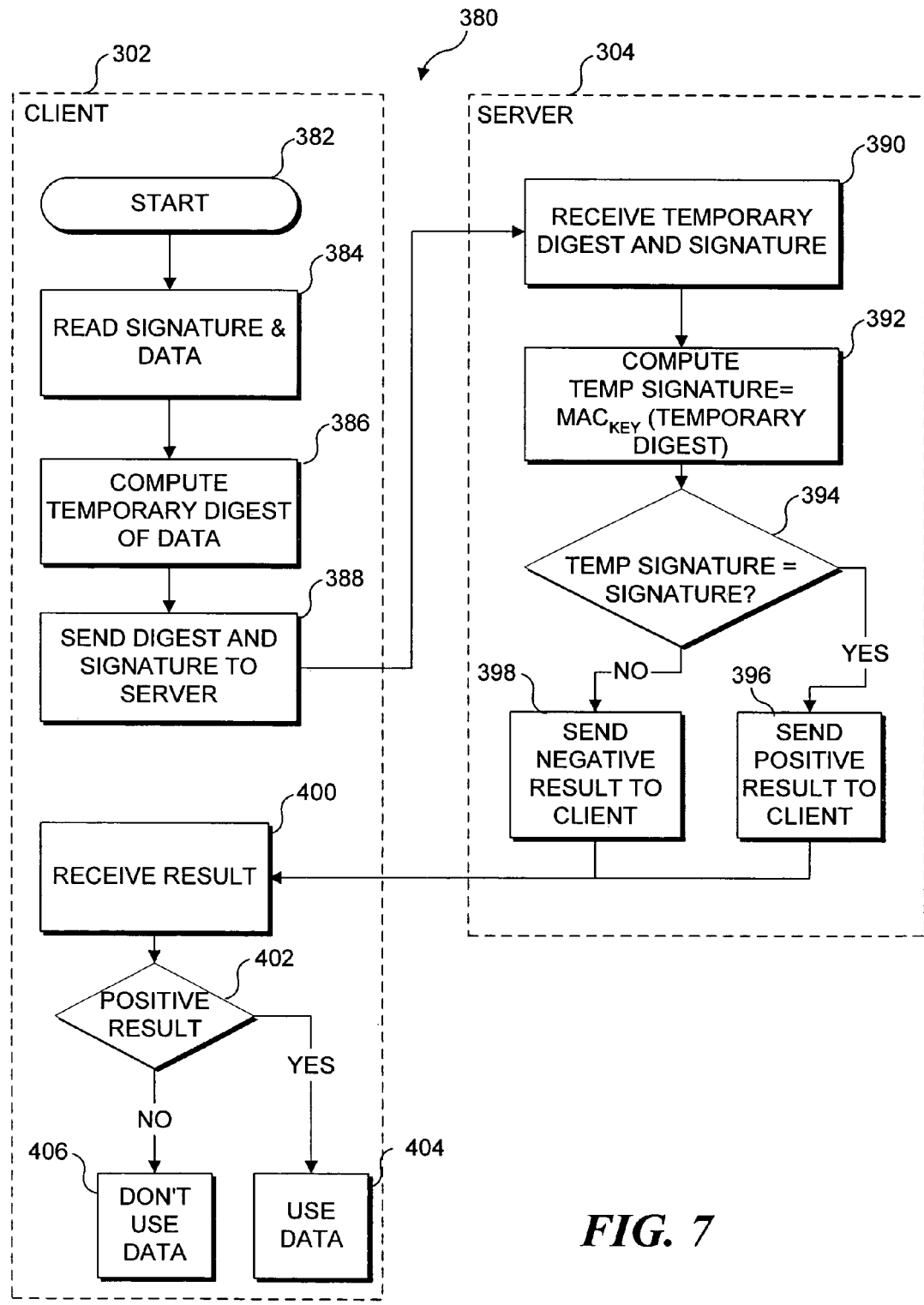
FIG. 7 is a flow chart showing a process for verifying the data using the signature of FIG. 6.

The embodiment illustrated in FIG. 6 and FIG. 7 enables data to be signed before being stored and the data that were stored to be verified without the need to transfer the data from the client to the server. Clearly, this approach will generally be preferable if the data must be moved over a relatively slower network connection, even a broadband connection, compared to a fast local area network, or if the amount of data to be securely signed is substantial, i.e., over 1 MByte.

FIG. 6 illustrates, in an exemplary manner, the process of data signing in the present invention, using a digest generated by a one way hash function. As indicated in a flow chart 360, a client 302 initiates the process in a step 362. The client computes a digest of about 20 bytes for the data by applying a SHA-1 one way hash or other form of one way hashing algorithm (e.g. MD5) to the data, in a step 364. The client sends the digest to the server to be signed in a step 366. The server receives the digest in a step 368 and computes a signature for the data (i.e., a signature of the digest) with a key known only to the server in a step 370. Again, the server preferably uses an HMAC algorithm or other secure signing approach to compute the signature and then sends the signature back to the client in a step 372. The client receives the signature in a step 374 and stores the data and the signature in a persistent storage, such as a hard drive, in a step 376.

FIG. 7 illustrates the logical steps of the process for verifying the data using the digest of FIG. 6. A flow chart 380 indicates that client 302 initiates the process in a step 382, before the data are used in a game session or for some other purpose. The client reads the stored data and the signature that was stored, in a step 384. In a step 386, the client computes a temporary digest of the data that were stored, again using the same hashing algorithm used during signing process at step 364 (FIG. 6). The client sends the temporary digest and signature to server 304 in a step 388. The server receives the digest and signature in a step 390 and computes a temporary signature from the temporary digest in a step 392, using the same algorithm and secret key used during the data signing process. The server then compares the temporary signature to the signature that the client had stored and then sent to the server, in a decision step 394. If the temporary signature and the signature are equal, the server sends a positive result back to the client in a step 396; otherwise, the server sends a negative result back to the client in a step 398. The client receives the result in a step 400. The client evaluates the result in a decision step 402 and if it is positive, indicating that the data stored have not been altered, the client uses the data as shown in a step 404. Otherwise, the client is not permitted to use the data, as shown in a step 406.

Data Signing and Verification Using a Signer ID

Figure 8:
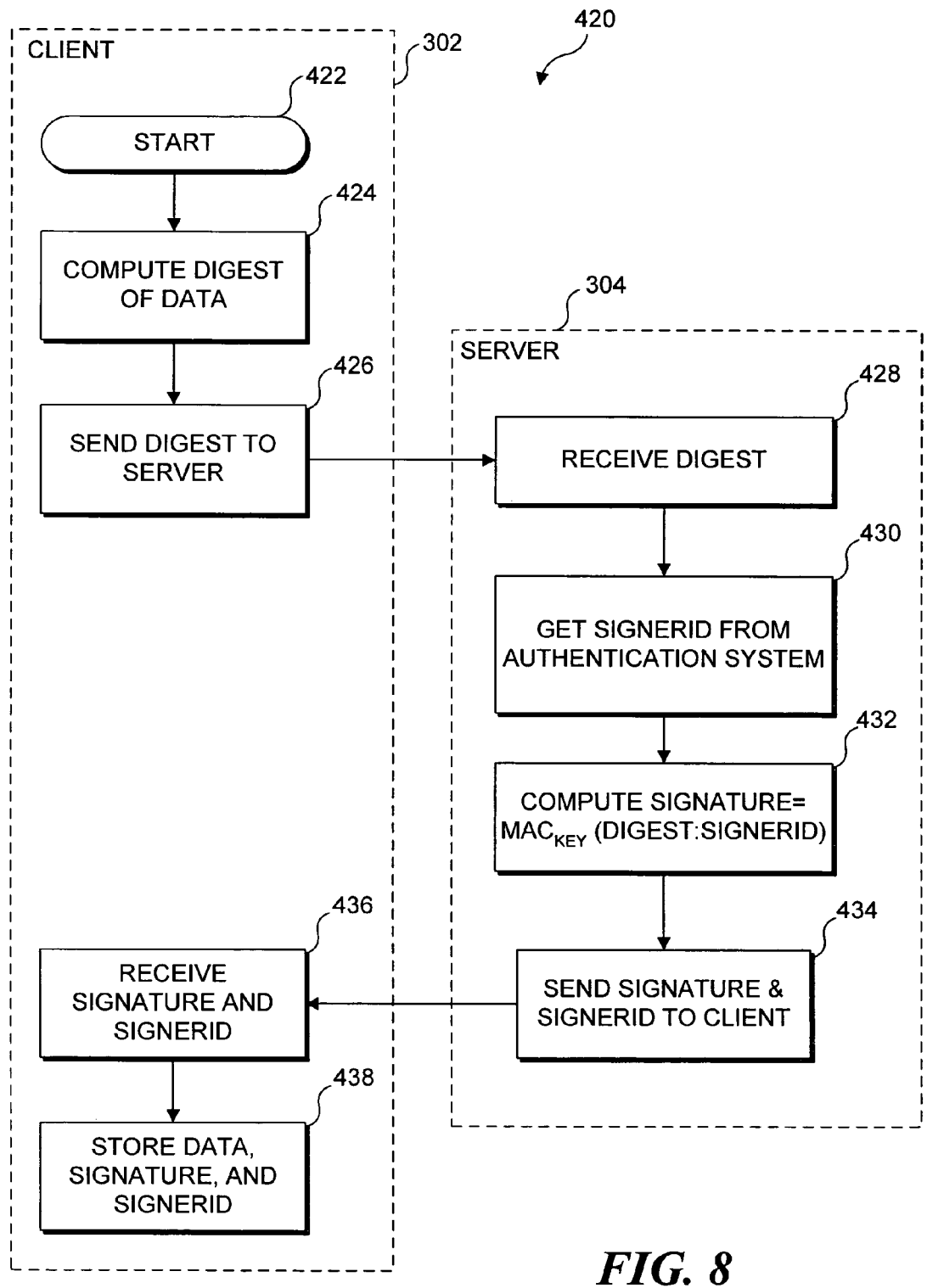
FIG. 8 is a flow chart showing a process for signing a digest of data so as to incorporate a signer ID.
Figure 9:
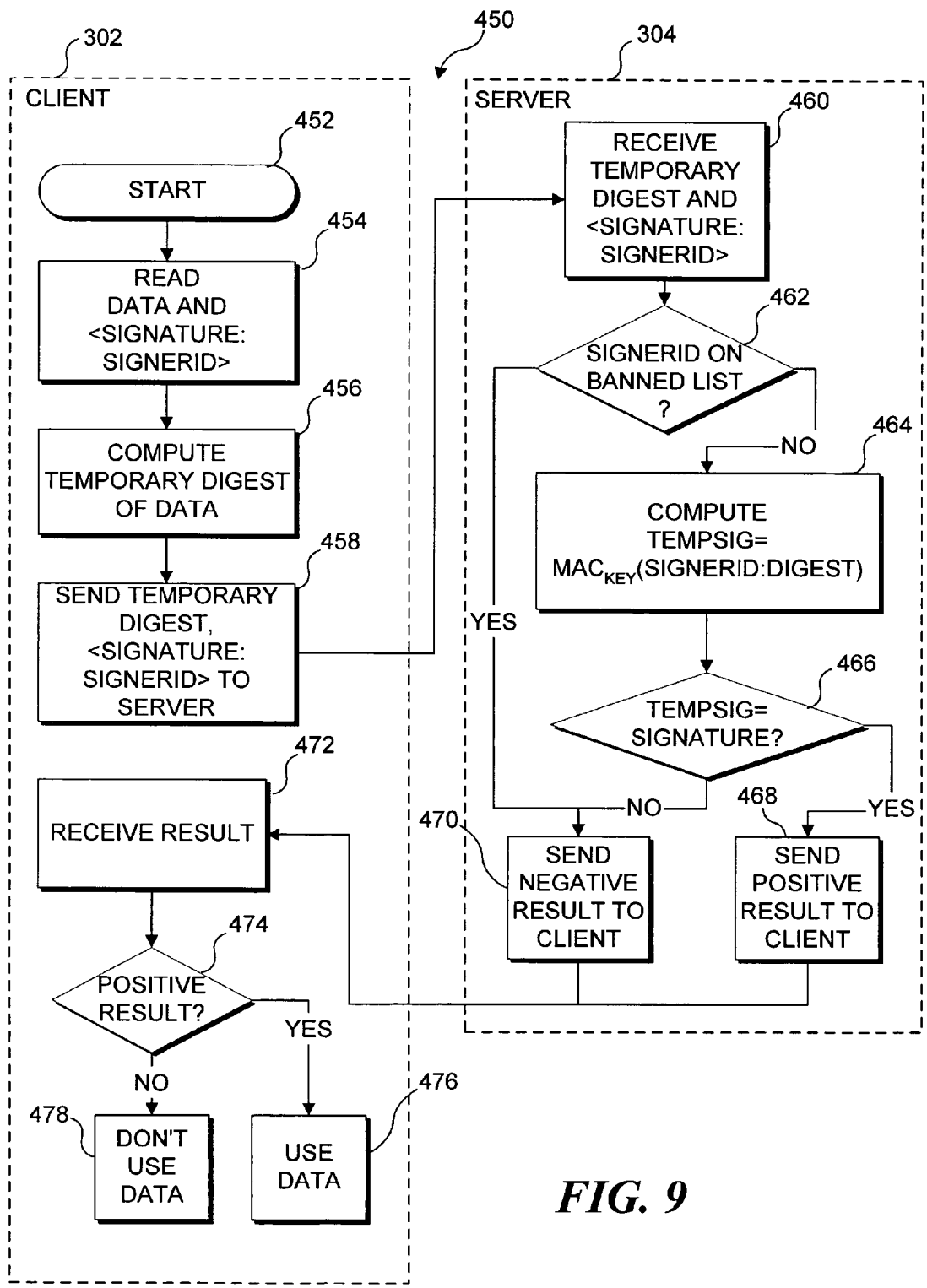
FIG. 9 is a flow chart showing a process for verifying the data and signer identity, using the signature of FIG. 8.

The logical steps illustrated in FIG. 8 and FIG. 9 respectively show how data about to be stored are securely signed so that the signature includes a signer ID for the client storing the data, and the corresponding verification of the data and the signer ID, based upon the signature. As indicated in a flow chart 420 in FIG. 8, a client 302 initiates the process in a step 422. The client computes a digest of the data using a SHA-1 hash to reduce the amount of data sent to the server in a step 424. The client sends the digest to be signed to server 304 in a step 426. The server receives the digest in a step 428 and gets the signer ID from the authentication system in a step 430. In this example, when a client signs onto the gaming service, the client (i.e., the game console) and the user are uniquely identified by information that is provided to the gaming service. The client cannot change the client identification or the identification of the user Who has subscribed to the gaming service and has logged onto the service. Accordingly, the signer ID can be either the unique identification of the user or more preferably, the unique identification of the client (game console) on which the data will be stored. The server computes a signature using the secret key known only to the server in a step 432, using the HMAC or other secure signature algorithm applied to a concatenation of the digest and the signer ID, and then sends the signature and signer ID (as a compound signature) back to the client in a step 434. The client receives the compound signature in a step 436 and stores the data and compound signature in the persistent storage, in a step 438.

FIG. 9 illustrates the logical steps for verifying the data that were stored using the compound signature of FIG. 8. A flow chart 450 indicates client 302 initiates the process in a step 452. The client reads the stored data, signature, and signer ID in a step 454. In a step 456, the client computes a temporary digest of the data using the same hashing algorithm used for producing the digest sent to the server for the signing of the data in step 424 (of FIG. 8). The client sends the temporary digest, and compound signature to server 304 in a step 458. The server receives the temporary digest and compound signature (i.e., the signature and signer ID) in a step 460. In a decision step 462, the server compares the signer ID from the compound signature to a list of banned signer IDs. If the signer ID is on the list because of some infraction that caused the client (or user of the client game console) to be banned from playing the game for which the data were saved, the server sends a negative result to the client in a step 470; otherwise, the server computes a temporary signature from the temporary digest in a step 464, using the same algorithm and secret used during the data signing process.

The server then compares the temporary signature to the signature that the client saved and subsequently sent to the server, in a decision step 466. If the temporary signature and the signature are equal, the server sends a positive result back to the client in a step 468. Otherwise, the server sends a negative result back to the client in a step 470. The client receives the result in a step 472. The client evaluates the result in a decision step 474 and, if the result is positive, the client uses the data that were stored, as indicated in a step 476. Otherwise, the client is not permitted to use the data, as noted in a step 478.

Data Signing Using an Intermediate Key and Verification

Figure 10:
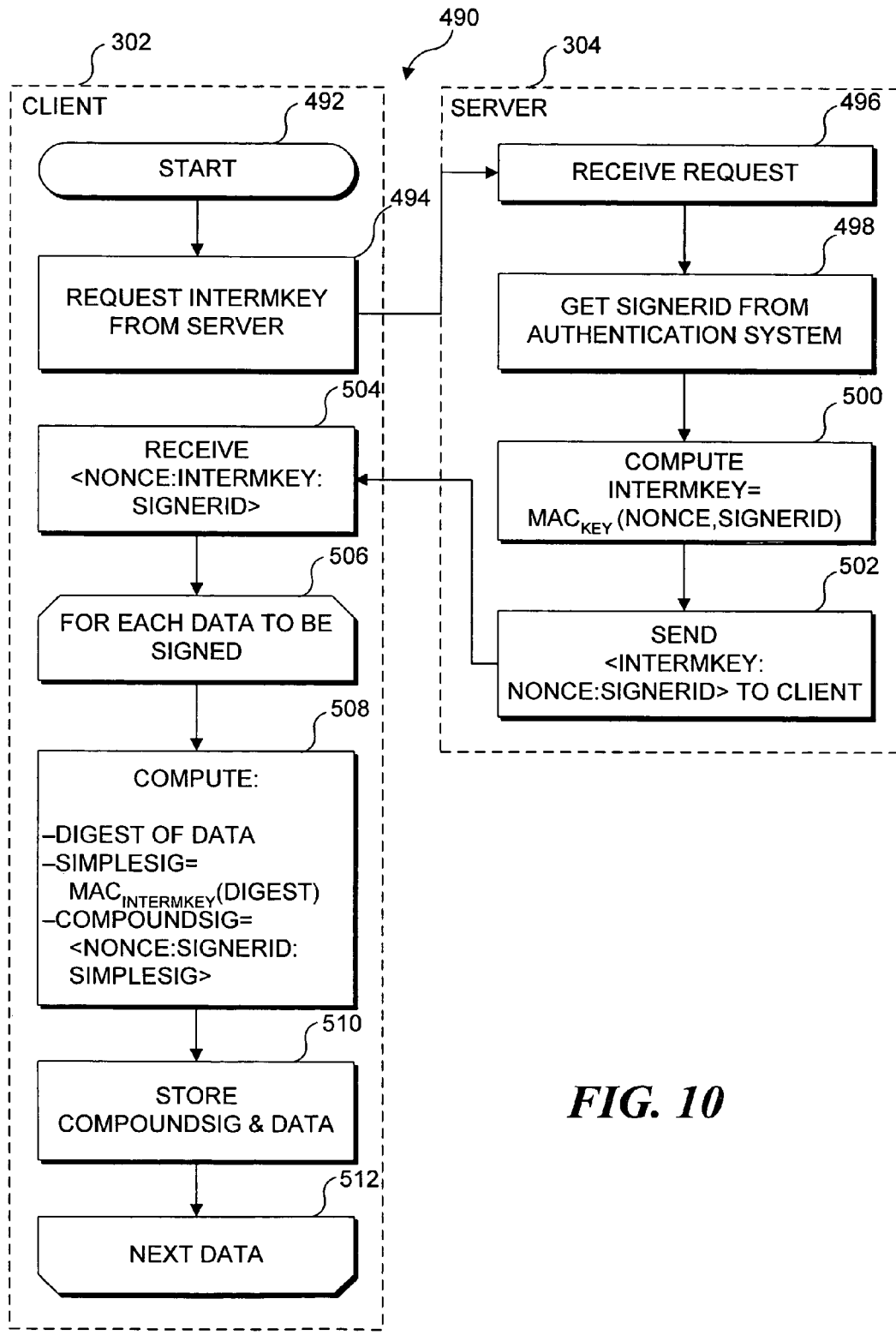
FIG. 10 is a flow chart showing a process for using an intermediate key for signing a digest of a set of data so as to incorporate a signer ID.
Figure 11:
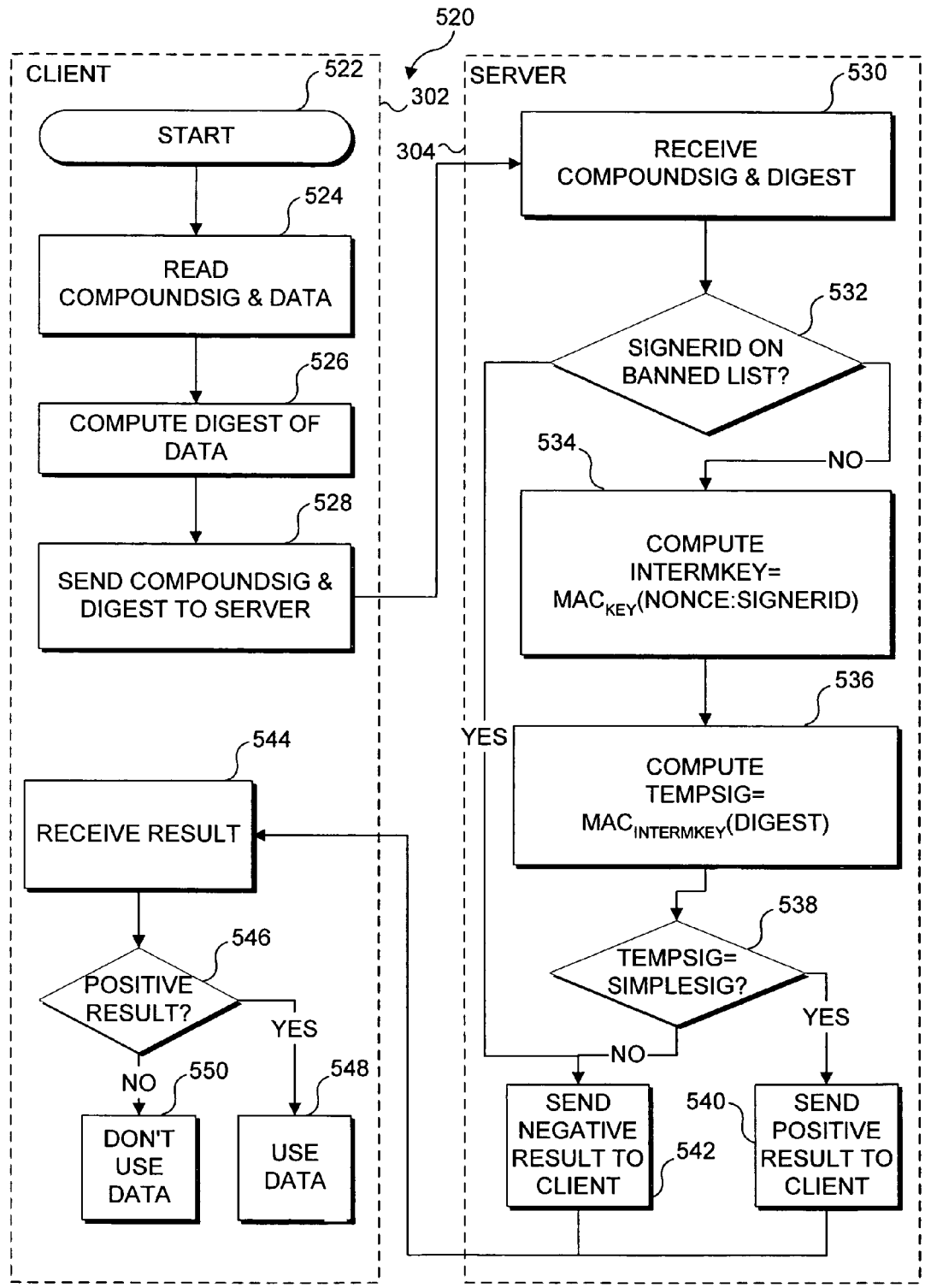
FIG. 11 is a flow chart showing a process for verifying the set of data and signer ID using the signature of FIG. 10.

The logical steps illustrated in FIG. 10 show how the server computes an intermediate key that is provided to the client for signing a plurality of sets of data on the client, so that each set of data need not be signed by the server. FIG. 11 illustrates the logical steps for verifying a set of the data that were signed in this manner and then stored by the client. As indicated in a flow chart 490 of FIG. 10, client 302 initiates the process in a step 492. In a step 494, the client sends server 304 a request for an intermediate key, to enable the client to sign each set of data that is to be stored by the client. The server receives the request in a step 496 and gets the signer ID for the client from the authentication system (or other source) in a step 498. In a step 500, the server computes an intermediate key for a concatenation of the signer ID and a nonce (i.e., a "number once," such as a time stamp or some other arbitrary random number) using the secret key known only to the server, with an HMAC or other secure signature algorithm. The server sends the client the intermediate key, the nonce, and the signer ID in a step 502. The client receives the intermediate key, nonce, and signer ID from the server in a step 504. The client processes each set of data in a loop that begins with a step 506 and ends with a step 512. Inside the loop, in a step 508, the client computes a digest of the data using an SHA-1 hash (or other hashing algorithm), and determines a simple signature of the digest using the intermediate key and the HMAC or other secure signing algorithm). In this embodiment, a compound signature is determined as a concatenation of the nonce, the signer ID, and the simple signature. In a step 510, the client stores the compound signature and the data. After all of the sets of data are processed, the loop terminates.

FIG. 11 illustrates the logical steps for verifying each set of data signed using the intermediate key of FIG. 10. In a flow chart 520 in FIG. 11, a step 522 indicates that client 302 initiates the verification process. The client reads the stored compound signature and stored data in a step 524. In a step 526, the client computes a temporary digest of the stored data using the same hashing algorithm used when signing the set of data in step 508 (FIG. 10). The client sends the compound signature that was stored and the temporary digest to a server 304, in a step 528. The server receives the compound signature and temporary digest in a step 530. In a decision step 532, the server compares the signer ID (which is contained in the compound signature) to a list of banned signer IDs. If the signer is on the list, the server sends a negative result to the client in a step 542, indicating that the set of data cannot be used by the client; otherwise, the server computes an intermediate key as a function of the nonce and signer ID using the secret key that was used during the signing process, at a step 534. In a step 536, the server computes a temporary signature as a function of the temporary digest using the intermediate key and the same hashing algorithm used by the client during the data signing process. The server then compares the temporary signature to the simple signature (which is contained in the compound signature that was stored by the client) that the client sent, in a decision step 538. If the temporary signature and the signature are equal, the server sends a positive result back to the client in a step 540, enabling the client to use the set of data. Otherwise, the server sends a negative result back to the client in a step 542. The client receives the result in a step 544. The client evaluates the result in a decision step 546 and, if it is positive, the client uses the data as shown in a step 548. Otherwise, the client is not permitted to use the data, as shown in a step 550.

Data Signing and Verification Using Public/Private Keys

Figure 12:
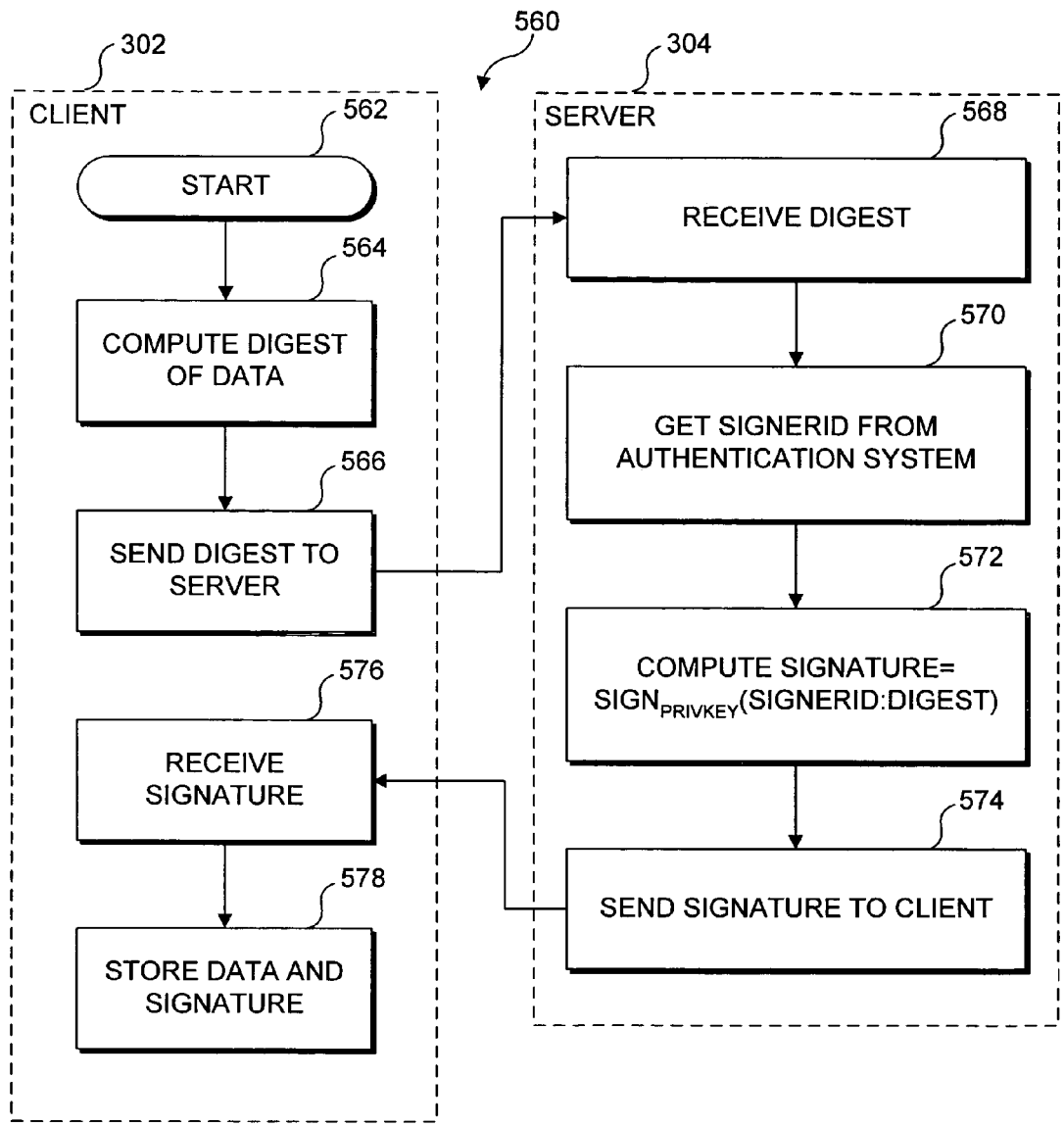
FIG. 12 is a flow chart showing a process for signing of a digest of data incorporating a signer ID using a private key of a public and private key pair.

The logical steps shown in FIG. 12 indicate how the server signs data before the data are stored by a client, using a private key of a public key and private key pair. In this embodiment, the signer ID is sealed into the signature but is not separately verified, because the public key/private key pair inherently authenticates the identity of the signer of the data. This embodiment is less favored because it is computationally intensive, and the time required to implement may likely be considered excessive, causing the storing and verification of data before use by the client to be delayed to an unacceptable extent. However, using public/private keys does have the advantage that verifying a signature is now possible without any interaction with the server.

As indicated in a flow chart 560 of FIG. 12, client 302 initiates the process in a step 562. The client computes a digest of the data using SHA-1 hash or other hashing algorithm, in a step 564. The client sends the digest to server 304 to be signed, in a step 566. The server receives the digest in a step 568 and obtains the signer ID uniquely associated with the client from the authentication system in a step 570. The server signs a concatenation of the digest and the signer ID using the private key in a step 572 and then sends the signature back to the client in a step 574. The client receives the signature in a step 576 and stores the data and signature in a step 578.

Figure 13:
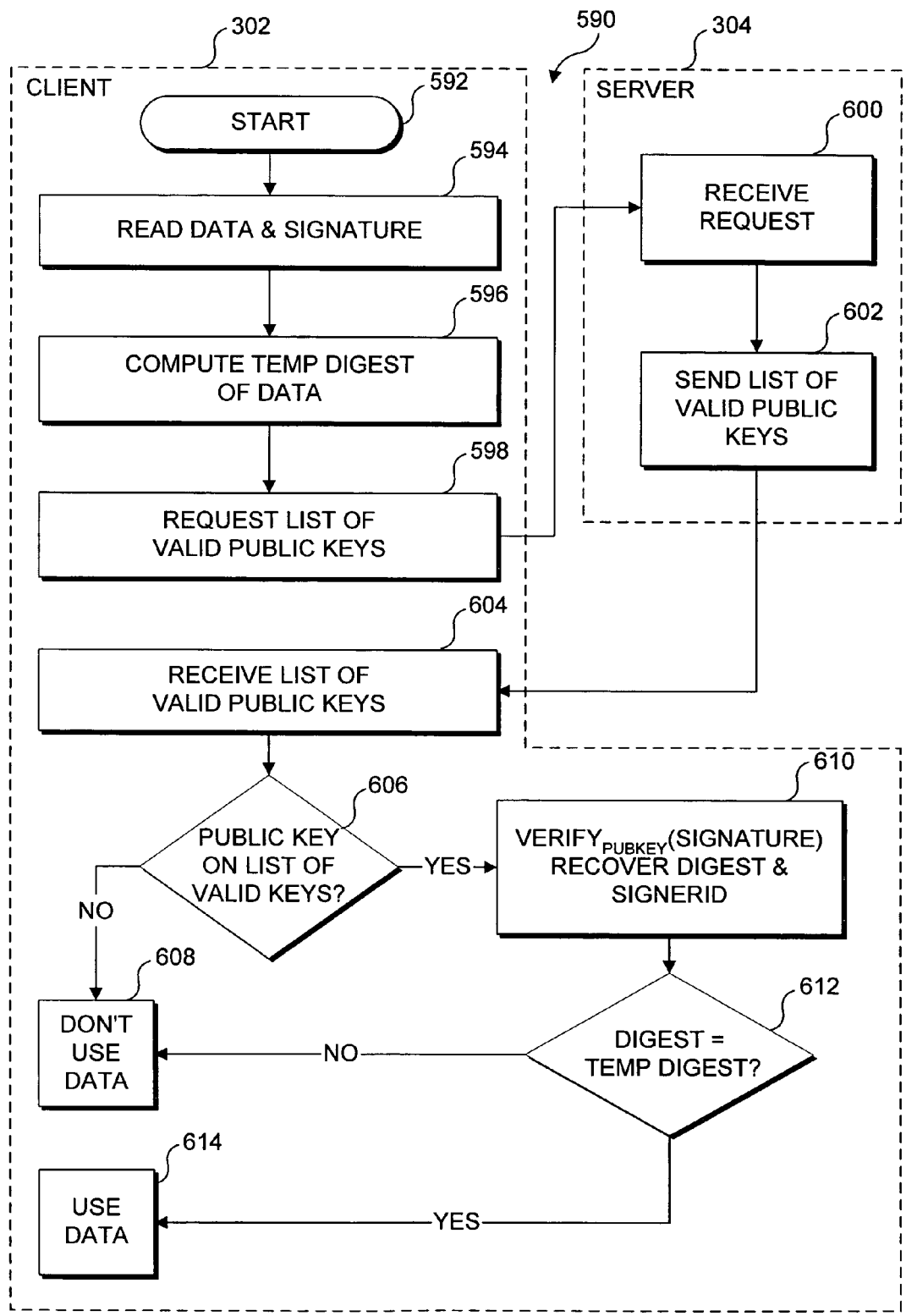
FIG. 13 is a flow chart showing a process for verifying the data and signer ID using the public key of the public and private key pair used in the process of FIG. 12.

FIG. 13 illustrates the logical steps for verifying the data using the public key from the pair of the public key and private key. A flow chart 590 indicates client 302 initiates the verification process in a step 592. The client reads the stored data and signature in a step 594. In a step 596, the client computes a temporary digest of the data that were stored using the same hashing algorithm used during the signing process (at step 564 in FIG. 12). In a step 598, the client requests a list of valid public keys from the server. Since a private key may be compromised if the private key is no longer a secret, this step ensures that the public key and private key pair are still valid in verifying the data that were stored.

The server receives the request in a step 600 and sends a list of valid public keys to the client in a step 602. The client receives the list in a step 604. The client checks the valid public key list in a decision step 606. If the public key is not on the list, the client is not permitted to use the data, as shown in step 608, because the data that were stored cannot be verified. Otherwise, the client verifies the signature using the public key in a step 610 to recover the digest and signer ID. The client then compares the digest and the temporary digest in a decision step 612. If the temporary digest is not equal to the digest, the client does not use the data, as shown in step 608; otherwise, the client may use the data that were stored, as shown in a step 614.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for ensuring that data generated by a client, comprising a first computing device, and subsequently stored in a persistent storage of the client have not been modified when the data are subsequently accessed for use by the client, the method comprising:

the client computing a first digest from the data;

the client sending the first digest to a server for signature computation;

the server, comprising a second computing device, computing a signature for the first digest by utilizing a secure signing algorithm and a key, the key known only by the server and available for use only by the server;

the server sending the signature to the client for storage;

the client storing both the signature and the data in the persistent storage of the client;

before the stored data being subsequently used by the client, the client computing a second digest from the stored data;

the client sending both the second digest and the signature stored in the persistent storage to the server to verify that the stored data has not been changed;

the server receiving both the second digest and the signature stored in the persistent storage;

the server generating a temporary signature of the second digest by utilizing the secure signing algorithm and the key known only by the server and available for use only by the server;

the server comparing the temporary signature to the signature stored in the persistent storage;

when the temporary signature is equal to the signature stored in the persistent storage, the server sending a positive result to the client so that, upon receiving the positive result, the client uses the data;

when the temporary signature is not equal to the signature stored in the persistent storage, the server sending a negative result to the client so that, upon receiving the negative result, the client does not use the data;

wherein the data comprise a plurality of different sets of data, and the method further comprising:

obtaining a signer identification (SID) for the client, the SID uniquely indicating the client and not being controlled by an operator of the client;

on the server, using the key for computing an intermediate key from a concatenation of an arbitrary value and the SID;

sending the intermediate key from the server to the client;

using the intermediate key to sign each set of the plurality of different sets of data to produce the signature for the each set of the plurality of different sets of data; and storing the signature, the arbitrary value, and the SID on the persistent storage.

2. The method of claim 1, further comprising determining if the SID that was obtained for the client is on a list of banned SIDs, and when so, indicating in the result that the data is not usable by the client.

3. A computer program product comprising a computer memory medium on which are stored machine readable instructions which, when executed on one or more computer processors, perform the method of claim 1.

* * * * *